United States Patent [19]

Ohsawa et al.

[11] Patent Number: 4,948,685
[45] Date of Patent: Aug. 14, 1990

[54] SHEET-SHAPED ELECTRODE, METHOD OF PRODUCING THE SAME, AND SECONDARY BATTERY USING THE SHEET-SHAPED ELECTRODE

[75] Inventors: Toshiyuki Ohsawa, Kawasaki; Toshiyuki Kabata, Yokohama; Okitoshi Kimura, Tokyo; Sachiko Yoneyama, Yokohama, all of Japan

[73] Assignee: Ricoh Company, Ltd., Tokyo, Japan

[21] Appl. No.: 240,727

[22] Filed: Sep. 6, 1988

[30] Foreign Application Priority Data

| Sep. 3, 1987 | [JP] | Japan | 62-219056 |
| Sep. 29, 1987 | [JP] | Japan | 62-242517 |
| Oct. 2, 1987 | [JP] | Japan | 62-224030 |
| Oct. 8, 1987 | [JP] | Japan | 62-252520 |
| Nov. 10, 1987 | [JP] | Japan | 62-282134 |
| Nov. 11, 1987 | [JP] | Japan | 62-283095 |
| Jun. 22, 1988 | [JP] | Japan | 63-152227 |

[51] Int. Cl.$^5$ .................. H01M 4/66; H01M 10/44
[52] U.S. Cl. .................. 429/213; 429/245; 204/2.1; 204/58
[58] Field of Search .................. 204/21, 53, 58; 429/213, 245

[56] References Cited

U.S. PATENT DOCUMENTS

| 4,321,114 | 3/1982 | MacDiarmid et al. | 429/213 X |
| 4,460,666 | 7/1984 | Dunkler et al. | 429/245 X |
| 4,472,487 | 9/1984 | Maxfield et al. | 429/213 X |
| 4,472,488 | 9/1984 | Maxfield et al. | 429/213 |
| 4,803,138 | 2/1989 | Kobayashi et al. | 429/213 X |
| 4,824,744 | 4/1989 | Kuo et al. | 429/245 X |

OTHER PUBLICATIONS

Iida et al, *Chemical Abstracts*, vol. 104, No. 34516, 2/86.
Shishikura et al, *Chemical Abstracts*, vol. 106, No. 217028, 6/87.

*Primary Examiner*—Stephen J. Kalafut
*Attorney, Agent, or Firm*—Oblon, Spivak, McClelland, Maier & Neustadt

[57] ABSTRACT

A composite sheet-shaped electrode comprising an aluminum collector and aniline type polymer serving as an active material, a secondary battery using the composite sheet-shaped electrode as the positive electrode thereof, and a method of preparing electrochemically the composite sheet-shaped electrode on the aluminum collector are disclosed.

14 Claims, 5 Drawing Sheets

SHEET-SHAPED ELECTRODE, METHOD OF PRODUCING THE SAME, AND SECONDARY BATTERY USING THE SHEET-SHAPED ELECTRODE

BACKGROUND OF THE INVENTION

The present invention relates to a sheet-shaped electrode, a method of producing the same, and a secondary battery using the sheet-shaped electrode.

Since electroconductive polymeric materials such as polyacetylene, polypyrrole, and polyaniline are lighter in weight as compared with metals, possess high electroconductivity by doping anions or cations and are electrochemically active, their applications to electrochromic elements, various sensors, electrodes of batteries and the like have been studied.

Among such electroconductive polymeric materials, an aniline type polymer is considered to be a promising electrode active material for electrode because of its superior characteristics such as its preparation being comparatively easy, having high stability against oxidation by air, and against water, and its oxidation-reduction being electrochemically reversible, having a long cycle life, and a small self-discharge.

However, when the aniline type polymer itself is used as the foregoing sheet-shaped electrode, it does not function adequately as collector. Therefore it is desirable to combine the aniline type polymer with other collectors when using the polymer as the electrode, in consideration of the improvement of the internal impedance and the reliability thereof rather than using the polymer alone.

Furthermore, an advantage of polymeric active materials such as aniline type polymer is that they can be worked into a sheet. When using such a polymeric active material, it is preferable that the collector for holding the same be also of a sheet type.

Particularly, when it is applied to a battery, it is preferable that the collector be light in weight and not voluminous with respect to the energy density thereof.

From the view point of the reduction in weight and thin filming of the collector, application of aluminum to the collector can be conceived. However, the surface of aluminum is generally covered with an aluminum oxide film, and the oxide film hinders the formation of a uniform aniline type polymer film on an aluminum substrate by the electrochemical polymerization of an aniline type monomer.

In order to solve this problem, a proposal is made in Japanese Laid-Open Patent Application No. 61-133557, in which it is disclosed that an electroconductive coating layer of a metal or carbon is formed on an aluminum substrate on which a naturally oxidized overcoat layer remains, and alternatively, an electroconductive polymer film is formed by electrochemical polymerization on an aluminum substrate by the steps of removing a naturally oxidized overcoat layer from the surface of the aluminum substrate by cleaning the same with a caustic alkali to expose its brightened surface, and then forming the electroconductive polymer film directly on the brightening surface of the aluminum substrate, or after forming a heavy metal coating layer thereon.

However, in the above case, even if direct electrochemical polymerization is tried on the brightening surface of the aluminum substrate from which the oxidized layer has been removed, the aluminum dissolves into the reaction solution of electrochemical polymerization so considerably that it is extremely difficult to form an aniline type polymer film on the brightening aluminum surface. Further even if the electrochemical polymerization is carried out in a selected reaction solution in which the aluminum is slightly dissolved, it is still difficult to form a polymer film on the aluminum substrate. Also, the provision of the electroconductive coating or a heavy metal coating complicates the process for the production of the electrode, reduces its productivity, and causes new problems such as poor adhesion between the aluminum collector and the aniline type polymer, and unreliable performance of the battery.

Such adhesion properties between the active material for the electrode and the collector is so important for increasing the collection efficiency that many studies have been made on the collectors for use in organic secondary batteries. For example, in Japanese Laid-Open Patent Application Nos. 58-115776 and 58-115777, there are disclosed methods of making collectors adhere to polymeric active materials. These methods, however, have the shortcomings that the film forming properties and mechanical strength of the polymeric active materials are poor, and the close contact between the collectors and the polymeric active material is not so completely achieved that the polymeric active material easily peels and falls off the collector during repeated charging and discharging, resulting in poor collection efficiency and reduction of its cycle life.

Furthermore, Japanese Laid-Open Patent Application Nos. 62-20243 and 61-133557 disclose an electrochemical polymerization for producing electroconductive polymers by use of a collector, such as an expanded metal and a metal network, in an electrode. When such an expanded metal is used, the morphological characteristics of conductive polymers are not fully utilized, and the control of their morphology is difficult. Possibly this is because the morphology of each conductive polymer is determined by the diameter and shape of the wire-like material. Also, these two-dimensional network type metals are difficult to work into a thin sheet, particularly into a sheet with a thickness of 50 $\mu$m or less, so that they are not suitable for use as a collector of a sheet-like electrode for a thin type battery. Furthermore, since the electroconductive polymers are formed around each wire material of the two-dimensional network structure, it is difficult to grow the polymers between the gratings of the network and, even if such growth takes place, the electroconductive polymer on the wire materials has such a considerable thickness that the uniformity in the thickness of the electrode is practically lost.

SUMMARY OF THE INVENTION

It is therefore an object of the present invention to provide a composite sheet-shaped electrode comprising an aluminum collector and an aniline type polymer, constructed with high adhesion between the two, which is light in weight and has high energy density and mechanical strength.

Another object of the present invention is to provide a battery which is light in weight, and has high energy density.

A further object of the present invention is to provide a method of preparing an aniline type polymer film on an aluminum collector, thereby producing the first-mentioned composite sheet-shaped electrode.

The first object of the present invention is attained by a composite sheet-shaped electrode, which is prepared by coating a sheet-shaped aluminum having a roughened surface with an aniline type polymer serving as an active material for the electrode.

The aniline type polymer may be overcoated with an electroconductive polymeric material. Alternatively, the aniline type polymer may be overcoated with a polymeric solid electrolyte.

The second object of the present invention is attained by a secondary battery which is fabricated by using the above-mentioned sheet-shaped electrode as positive electrode. The secondary battery according to the present invention may be comprised of a positive electrode, a separator, and a negative electrode, each element being in the shape of a sheet, with the positive electrode and the negative electrode folded in such a manner as to cross each other through the separator, in which the above-mentioned sheet-shaped electrode is employed as the positive electrode, which comprises a collector coated with the aniline type polymeric active material on one or both sides of the collector. Alternatively, the secondary battery according to the present invention may be comprised of a positive electrode, a solid electrolyte and a negative electrode, in which the above-mentioned sheet-shaped electrode is employed as the positive electrode.

The third object of the present invention can be attained by a method of electrochemically polymerizing aniline or an aniline derivative in the presence of an acid with PKa of $-2.5$ to 2.5 when producing the first mentioned composite sheet-shaped electrode. Alternatively, a second step of performing electrochemical polymerization in the presence of $HBF_4$ may be included in the above-mentioned method.

DETAILED DESCRIPTION OF THE PREFERRED EMBODIMENTS

With reference to the accompanying drawings, the structure of a sheet-shaped electrode according to the present invention will now be explained.

Figure 1:
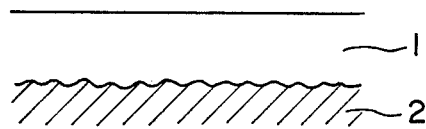
FIGS. 1 to 3 are schematic illustrations in explanation of the layered structures of examples of a sheet-shaped electrode according to the present invention.
Figure 2:
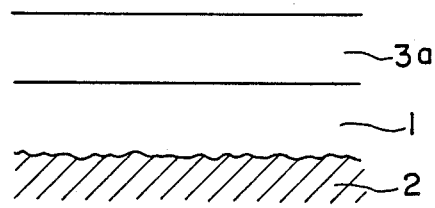
Figure 3:
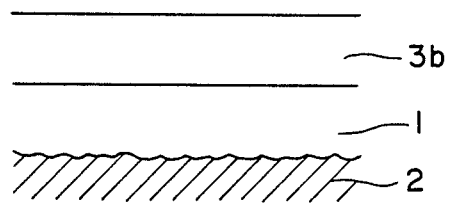

FIGS. 1 to 3 are schematic illustrations in explanation of the layered structures of examples of a sheet-shaped electrode according to the present invention.

In these figures, reference numeral 1 indicates an aniline type polymeric active material; reference numeral 2, an aluminum collector treated so as to have a roughened surface; reference numeral 3a, an electroconductive polymeric material overcoat layer; and reference numeral 3b, a polymeric solid electrolyte.

A sheet-shaped electrode of the present invention is characterized in that a collector coated with an aniline type polymeric active material is made of aluminum and the aluminum collector is treated so as to have a roughened surface. By the roughening treatment of the aluminum collector, an aniline type polymeric active material film can be securely formed on the aluminum collector, and strong adhesion of the aniline type polymeric active material to the aluminum collector is attained. As a matter of course, good contact is also attained between the active material film and the aluminum collector by the surface treatment. Furthermore, the contact area between the aluminum collector and the aniline type polymeric active material film can be actually increased, and consequently the internal resistance thereof can be decreased. Also, the short-circuit current density in a battery can be increased when this sheet-shaped electrode is employed.

As the aluminum collector, an electroconductive aluminum sheet is employed. Here the "sheet" means a thin flat plate having a thickness of 3 $\mu$m to 150 $\mu$m, preferably 5 $\mu$m to 100 $\mu$m, more preferably 10 $\mu$m to 80 $\mu$m, and a size of 2 $cm^2$ or more, preferably 10 $cm^2$ or more. The thickness and the size of the aluminum collector may be varied as desired, depending upon its applications, and therefore are not limited to the above-mentioned respective ranges. However, if the thickness is under 3 $\mu$m, it may be difficult to obtain a sufficient mechanical strength of the collector in view of the roughening treatment of the surface; and if the thickness is over 150 $\mu$m, the merit of light weight may not be advantageously obtained and the self-recovery property of the aluminum collector against its folding may be lost in view of the maximum amount of the active material fixed to the aluminum sheet.

It is preferable that the aluminum sheet for use in the present invention have mainly crystalline structures of (110) and (111) at the surface thereof.

The rough surface of the aluminum sheet for use in the present invention means a surface having unpenetrating micro-irregularities. When an aniline type polymeric active material film is formed on the aluminum collector by electrochemical polymerization, it is preferable that the irregularities in the surface of the aluminum collector be in such a shape as to avoid the concentration of electric field in particular portions of the surface of the aluminum collector during the electrochemical reaction for the formation of the aniline type polymeric active material film on the aluminum collector. More specifically, it is preferable that the irregularities be uniform in the direction of the surface of the aluminum collector, with a surface roughness of 1 $\mu$m to 24 $\mu$m, preferably 3 $\mu$m to 12 $\mu$m, with a cycle of 100 $\mu$m or less. Edgy irregularities are not preferable in the surface thereof. The roughened surface is formed by mechanical abrasion using, for instance, emery cloth, abrasive powder and polishing machine, or by electrochemical methods such as ion sputtering and electrolytic etching. The roughened surface may be worked in such a shape as a porous shape, a fibrous shape and a non-woven fabric shape.

Further, it is preferable that these kinds of treatment be carried out under an inert gas atmosphere. By the roughening of the collector surface, the surface irregularities are coated with the aniline type polymeric active material, and, therefore, the contact area between the aniline type polymeric active material and the collector is remarkably increased as compared with the case of untreatment. Consequently, the collection efficiency of the sheet-shaped electrode of the present invention is significantly improved.

Thus, in this electrode, the aniline type polymeric active material film is closely adhered to the aluminum collector, so that a long life and highly reliable battery can be obtained when this electrode is employed.

It is preferable that the aniline type polymeric active material film have a thickness of 1000 $\mu$m or less.

Also, in the present invention, the aluminum collector sheet can be used in the form of a composite sheet in combination with other substrates, for the mechanical reinforcement of the collector sheet.

As the materials for such substrates, metals and plastic materials may be employed, but they are not limited to such materials, so long as they are capable of reinforcing the aluminum collector sheet, in particular, the flexural and tear strength thereof, but plastic materials are preferable for use from the viewpoint of the weight lightening thereof. Practically, metals such as nickel and stainless steel, and plastics such as polyester, polyolefin, polycarbonate, and acrylic resin can be employed. The substrate materials for the aluminum collector sheet may be chosen, for instance, in accordance with an employed method of making a composite collector that is compound of the aluminum sheet and a reinforcement substrate, and the function of the collector to be developed.

When preparing a composite collector comprised of the aluminum collector sheet and a plastic reinforcement substrate, aluminum may be deposited on the substrate by vacuum deposition or sputtering. When a solvent-soluble plastic material such as polycarbonate and acrylic resin is employed as the material for the substrate, such a resin can be coated on the aluminum collector sheet by dip coating or melt coating. However, the first mentioned vacuum deposition and the sputtering methods are preferable in view of the weight lightening of the prepared composite collector and the adhesion strength between the aluminum collector sheet and the reinforcement substrate. The electroconductive layer formed by the vacuum deposition or sputtering is so thin that it is preferable to prepare a composite collector by roughening the surface of the substrate using, for instance, emery paper, and then depositing aluminum on the roughened substrate. When the substrate is made of a metal, aluminum may be electrochemically deposited on the substrate, in addition to the abovementioned vacuum deposition and sputtering methods. The electrochemical method has the advantage over the other methods that a large size composite collector can be easily fabricated.

It is preferable that the weight of the aniline type polymeric active material be not more than 2 times the weight of the aluminum collector sheet for obtaining a maximum function of the collector. When the amount of the aniline type polymeric active material is more than 2 times the weight of the aluminum collector sheet it may become necessary to include some other collector material in the aniline type polymeric active material.

In the present invention, the close adhesion between the aluminum collector sheet and the aniline type polymeric active material can be improved by subjecting the aluminum collector sheet to the surface roughening treatment. This advantageous effect obtained by the surface roughening treatment, however, is of a secondary significance in the present invention. The most important advantage obtained by this surface roughening treatment is that the aniline type polymeric active material layer can be formed with a uniform thickness on the aluminum collector.

As mentioned previously, in order to form an aniline type polymeric active material layer on the aluminum collector, conventionally, as a pretreatment before forming the active material layer on the aluminum sheet, it is necessary to form an electroconductive layer on the surface of the aluminum sheet which has a naturally formed aluminum oxide layer thereon, or to coat a brightening surface of the aluminum sheet from which the aluminum oxide layer has been eliminated, with a heavy metal layer. However, as a matter of fact, the aniline type polymeric active material layer cannot be directly formed on the brightened surface of the aluminum sheet by electrochemical polymerization as is demonstrated in Comparative Example 4 described later. It is considered that this is because the rate at which aluminum oxide is formed is so great that even if the aluminum oxide layer is eliminated from the aluminum sheet to expose the brightening surface, a new aluminum oxide layer is immediately formed thereafter, so that an aluminum oxide layer in fact remains in the brightening surface of the aluminum sheet and the remaining aluminum oxide layer hinders the electrochemical polymerization of the aniline type monomer.

Therefore, it is an unexpected remarkable fact that by subjecting the aluminum surface to such a simple surface roughening treatment, and despite the presence of a naturally formed aluminum oxide layer on the aluminum surface after the treatment, the aniline type polymeric active material layer can be formed with a uniform thickness on the aluminum surface, while attaining excellent adhesion of the active material layer to the aluminum surface.

A sheet-shaped electrode according to the present invention can be prepared by depositing an aniline type polymeric active material in the form of a layer on the above-mentioned surface treated aluminum sheet by electrochemical polymerization of aniline or an aniline derivative monomer, using the aluminum sheet as an electrode for the electrochemical polymerization. In this case, the aniline type polymeric active material layer can be formed on both sides of the aluminum sheet, but if the electrochemical polymerization is carried out with one side of the aluminum sheet masked with an insulating layer, the aniline type polymeric active material layer can be formed only on the other side of the aluminum sheet.

The method of this electrochemical polymerization is generally described, for example, in J. Electrochem. Soc., Vol. 130, No. 7, 1508-1509 (1983), Electrochem. Acta., Vol. 27, No. 1, 61-65 (1982), and J. Chem. Soc., Chem. Commun., 1199-(1984).

More specifically, in the present invention, this polymerization is carried out by placing in an electrolytic cell a solution of a monomer, an electrolyte, and a solvent, immersing a pair of positive and negative electrodes in the solution and causing electric current to flow across the electrodes, so that the electrochemical polymerization is carried out by anodic oxidation or cathodic reduction.

In the electrochemical polymerization, aniline and aniline derivatives having the following general formula (I) and general formula (II) can be employed:

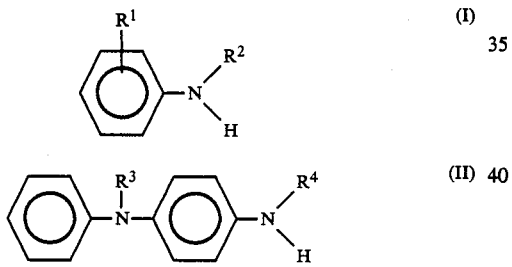

wherein $R^1$, $R^2$, $R^3$ and $R^4$ each represent hydrogen, an alkyl group and an aryl group.

Specific examples of the above aniline and aniline derivatives are as follows: aniline, 4-aminodiphenylamine, N-methylaniline, N-ethylaniline, 4-(N-methyl amino)diphenylamine, diphenylamine, o-methylaniline, o-ethylaniline, m-methylaniline, m-ethylaniline, 4-(N-ethyl amino)diphenylamine, N,N'-diphenyl-p-phenylene diamine. These aniline and aniline derivatives can be used alone or in combination. Of the above, aniline is the most preferable for use in the present invention.

The electrochemical polymerization of aniline and aniline derivatives thereof is carried out in an aqueous solution of an acid with PKa of $-2.5$ to $+2.5$, preferably $-2.0$ to $+2.0$. Examples of such an acid are sulfonic acids such as sulfuric acid, p-toluenesulfonic acid, benzene sulfonic acid, naphthalene sulfonic acid; and trifluoroacetic acid. When perchloric acid (PKa: about $-3.1$), tetrafluoroboric acid (PKa: about $-4.9$) and hydrochloric acid (PKa: about $-4$) are used, the electrolytic current of aluminum is observed at the polymerization potential of aniline so that the polymerization does not proceed. When nitric acid (PKa: about $-3$) is used, the electrolytic current is not observed at the polymerization potential of aniline and aluminum is not dissolved, but polyaniline is not produced. When hydrofluoric acid (PKa: about 3.2) is used, a similar phenomenon is observed and polymerization of aniline does not proceed. These phenomena are presumably caused by the influence of the elution and oxidation of aluminum on the polymerization.

From the above results, it was discovered that the polymerization proceeds well when acids with PKa in the range of $-2.5$ to $+2.5$ are employed. However, among acids with PKa outside the range of $-2.5$ to $+2.5$, when tetrafluoroboric acid is used, the fibril of the aniline type polymer grows well, and the aniline type polymer indicates not only excellent self-supporting property, but also excellent electric properties. Therefore, in order to obtain the aniline type polymer having such excellent properties, it is advantageous to perform the electrochemical polymerization with two steps, namely the first step of forming an aniline type polymer film on the surface of an aluminum sheet by use of an acid with PKa in the range of $-2.5$ to $+2.5$, in which the aluminum sheet is not dissolved, and the second step of continuing the electrochemical polymerization in the presence of the acid by which the growth of the fibril of the aniline type polymer is promoted.

It is preferable that the fibril-shaped aniline type polymer have a fibrous structure including fibers having an average diameter of 0.06 $\mu$m to 0.3 $\mu$m.

According to the study carried out by the present inventors, it has been found that the factors which have an effect on the morphology of the fibril of the polyaniline type polymer are, besides the above-mentioned kind of acids, the synthesis conditions of the polyaniline type polymer, such as the kind of the employed electrolyte, pH, electrolytic potential or electrolytic current and temperature, by which the length, diameter, specific area of the fibril and the electrode characteristics are changed. Various studies on the application of the aniline type polymer to batteries have indicated that when an electrode comprising the aniline type polymer formed on a porous electrode is used for the battery, particularly when the specific area of the aniline type polymer is 1-200 m$^2$/g as measured by BET, a smooth electrode reaction at charging and discharging is favorably performed in the battery.

The concentration of an aniline type monomer compound at the electrochemical polymerization is generally 0.001 to 2.0 moles/l, preferably 0.01-1.5 moles/l. The acid concentration is generally 0.5 moles/l or more, preferably 0.5-6.0 moles/l, more preferably 0.5-4.0 moles/l, and when the mole ratio of the acid to the monomer is in the range of 3 to 10, the growth rate of the aniline type polymer is great and an aniline type polymer with good adhesion and high degree of polymerization is uniformly produced on the aluminum electrode.

For the electrochemical oxidation polymerization, constant-current method, constant-potential method, constant-voltage method and potential scanning process may be employed. In the constant-current method, the current density is generally 0.1-50 mA/cm$^2$, preferably 1-30 mA/cm$^2$. In the constant potential method, the positive electrode potential against the saturated calomel reference electrode is generally 0.5 to 2.5 V, preferably 0.7 to 0.95 V.

The materials for the electrodes for electrochemical polymerization in the present invention are aluminum for the work electrode, and metals such as Au, Pt and Ni, metal oxides such as $SnO_2$ and $In_2O_3$, carbon, a composite electrode or a coating electrode for the counter electrode.

In the present invention, by providing a polymer coating layer on the thus prepared aniline type polymer, the fibrils of the aniline type polymer may be protected and the mechanical strength of the composite layer is improved because of the binding of the fibrils with the polymer coating layer. As the materials for the polymer coating layer for use in the present invention, for example, polymers produced from furan, pyrrole, thiophene, benzene, diphenyl benzene, azulene and derivatives thereof, and insoluble polyaniline produced by use of acids such as $H_2SO_4$, HCl and $HBF_4$, can be employed, which are insoluble in organic solvents such as N,N-dimethylformamide, do not hinder the dedoping reaction of the aniline type polymer, and are capable of performing ion dispersion.

Particularly preferable materials for the polymer coating layer are insoluble polyanilines which are prepared in the presence of $H_2SO_4$, HCl and $HBF_4$, diphenyl benzidine polymer which is close in the doping potential to that of the aniline type polymer, polyfuran which is proposed by the present inventors in Japanese Laid-Open Patent Application No. 62-150651 and polypyrrol having high mechanical strength. It is preferable that the coating amount of the polymer coating layer be in the range of 0.05 to 1.0 part by weight to 1 part by weight of the fibrous polyaniline.

These polymers can be coated by the electrochemical polymerization of the above-mentioned monomers using the previously obtained fibrous aniline type polymer electrode as the electrolytic electrode. Thus, the fibrils of the fibrous aniline type polymer are uniformly coated with polymer coating layer and the binding between the fibrils is also done.

Monomers used in the electrochemical polymerization are, for example, aniline, furan, pyrrol, thiophene, benzene, triphenylamine, diphenyl benzidine, carbazole, azulene or derivatives thereof, but not limited to these materials.

As the anions of the electrolytes for the electrochemical, for example, Cl, $BF_4^-$, $AsF_6^-$, $SbF_6^-$, $PF_6^-$, $ClO_4^-$, $HSO_4^-$, $SO_4^{2-}$, aromatic sulfonic acid anions and metal complex anions, and as cations, for example, and $H^+$, quaternary ammonium cations, lithium, sodium and potassium cations are employed, but not limited to these.

As the solvents employed in the electrochemical polymerization, for example, water, acetonitrile, benzonitrile, propylene carbonate, γ-butyrolactone, dichloromethane, dioxane, dimethylformamide, and nitro type solvents such as nitromethane, nitroethane, nitropropane, and nitrobenzene can be employed, but are not limited to these solvents.

Further according to the present invention, in order to protect the fibrils of the aniline type polymer on the aluminum collector and improve the mechanical strength thereof, the aniline type polymer may be coated with a polymeric solid electrolyte, thereby providing a further sheet-shaped electrode according to the present invention.

In the present invention, as the resins used for imparting mechanical strength to the aluminum-aniline type polymer film composite material, while maintaining other characteristics thereof, ionic conductive polymeric materials are selected. In general, the lower the glass transition temperature of polymers, the higher the ionic conductivity. Therefore, polymeric materials having high ionic conductivity have the features that they are flexible and the molecular motion of the polymer chains is vigorous at room temperature. Therefore, the polymeric materials having high ionic conductivity not only improve the strength of the composite electrode, but also absorb the stress caused by the swelling and shrinking which take place during the mass transfer in the redox reaction of the electrode.

The polymeric solid electrolytes for use in the present invention are polymeric materials have high ionic conductivity and low electronic conductivity, and comprise a polymer serving as matrix and an electrolytic salt serving as carrier.

It is advantageous to add organic compounds having high boiling points and high dielectric constants to the polymeric solid electrolytes.

The polymeric solid electrolytes may be roughly classified as follows:

(1) 3-component gel type semisolid electrolytes comprising a solvent medium, a polymer matrix and an electrolyte, (2) 2-component solid electrolytes comprising a polymer matrix having an ion dissociation group and an electrolyte salt, and (3) Crosslinked type polymeric solid electrolyte comprising the polymer matrix in the above 3-component gel type semisolid electrolytes, which is crosslinked.

As the polymer matrix in (1), for example, matrixes comprising polyalkylene oxides such as polyethylene oxide, and polypropylene oxide; polyacrylonitrile; and polyvinylidene fluoride, can be given. As the polymer matrix in (2) and (3), the polymers containing the following moieties in the main chains or side chains can be given:

Of the above, the crosslinked polyethylene oxide in (3) is preferable for use as a coating material of the electrode because of its mechanical strength and flexibility. Further by using a thermofusible adhesive polymer, such as polyacrylonitrile, polyethylene oxide, polyvinylidene fluoride and polyethylene imine as a component in the polymer matrix in (3), an organic solid secondary battery with superior adhesion at the interface thereof can be fabricated with high efficiency by the heat bonding method.

As electrolytic salts used as carrier, electrolytic salts which comprise anions such as $SCN^-$, $Cl^-$, $Br^-$, $I^-$, $BF_4^-$, $PF_6^-$, $CF_3SO_3^-$, $AsF_6^-$, $ClO_4^-$, $B(C_6H_5)_4^-$; and cations, for example, alkali metal cations such as $Li^+$, $Na^+$, $K^+$, and organic cations such as $(C_4H_9)_4N^+$, $(C_2H_5)_4N^+$ are used.

As additives in (1), high-boiling point solvents (plasticizers) such as crown ethers and oligomer components may be used.

Examples of the previously mentioned organic compounds having high-boiling point and high dielectric constant to be added to the polymeric solid electrolytes are propylene carbonate, ethylene carbonate, dimethyl formamide, dimethyl acetoamide and the like. By adding these compounds, the ionic conductivity of the polymeric solid electrolytes remarkably increases almost to that of an electrolytic solution. When a composite electrode is used in a solution system or a semisolid system, since the solid electrolyte is caused to swell by the addition of the above-mentioned compounds the polymeric solid electrolytes must be impregnated with these compounds before the lamination thereof.

The composite lamination of the polymeric solid electrolyte is carried out by dipping or casting the polymeric solid electrolyte on an aluminum collector-aniline type polymerizate active material. Furthermore, in the case of a solid electrolyte containing a thermofusible polymer, after the lamination, it is heated to a temperature above the melting point of the solid electrolyte and pressed, to increase the adhesion strength between the electrode active material and the polymeric solid electrolyte and proceed smoothly an interfacial redox reaction therebetween. It is preferable that the thickness of the polymeric solid electrolyte layer be 100 μm or less.

The thickness of the aniline type electrolytic polymer film can be controlled by the quantity of electric charge during the electrochemical polymerization.

When highly close adhesion is attained between the aluminum collector and the aniline type polymer film at the lamination of the polymeric solid electrolyte thereon, the polymeric solid electrolyte does not enter between them, i.e. a layer which disturbs the electronic conductivity between them is not formed, so that good battery characteristics can be obtained when used in a battery.

The hitherto described electrodes of the present invention are applicable to a variety of elements, for example, secondary batteries, electrochromic elements, switching elements, sensors, photoelectric transfer elements, memory elements and the like.

The application of the electrodes of the present invention to a secondary battery will now be explained.

In the secondary battery, an electrode of the present invention at least as the positive electrode, in which the polymeric active material stores energy by the doping of an anion or cation and releases energy through external circuits by the dedoping thereof. Namely, since the doping and the dedoping are reversibly performed in the electrode of the present invention, its application to a secondary battery is feasible.

The battery is composed of a positive electrode, a negative electrode and an electrolytic solution (comprising a solvent and an electrolyte). Also, a separator impregnated with an electrolytic solution can be provided between the electrodes.

Furthermore, in place of the electrolytic solution and the separator, a solid electrolyte, particularly a polymeric solid electrolyte as described later, can be used.

The configurations of secondary batteries using the electrodes of the present invention will now be explained.

Although various kinds of the configurations may be conceivable, but it is preferable that a positive electrode and a negative electrode are provided so as to face each other with a separator disposed therebetween.

As mentioned previously, the electrodes according to the present invention may be fabricated in the following forms:

(1) An electrode comprising a sheet-shaped aluminum collector which is treated for one side surface thereof to be roughened, and an aniline type polymeric active material which is coated on the roughened surface of the aluminum collector (hereinafter referred to as the first electrode); and (2) An electrode comprising a sheet-shaped aluminum collector which is treated for both sides thereof to be roughened, and an aniline type polymeric active material which is coated on both roughened surfaces of the aluminum collector (hereinafter referred to as the second electrode).

In particular, in the latter electrode, since both sides of the electrode can be utilized as active material layers, there are many variations in the electrode.

First, a thin type battery will now be explained, in which the second electrode is used at least as a positive electrode, and the positive electrode and a negative electrode are alternately crossed and folded with a separator interposed therebetween, and the electrode terminals of the collector are disposed at the terminals corresponding to the positive and negative electrodes. The thin type battery with such a folded structure is novel. As a matter of course, as the collector, a non-surface-treated collector may be employed, but the surface-treated collector is better in the performance that the non-surface-treated collector.

Figure 4:
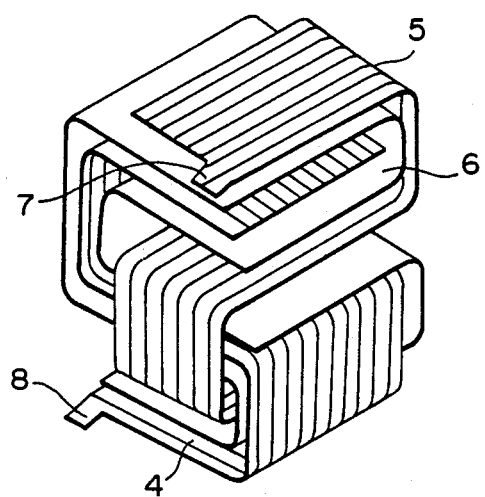
FIG. 4 is a perspective view of the layered structure of a thin type battery according to the present invention.
Figure 5:
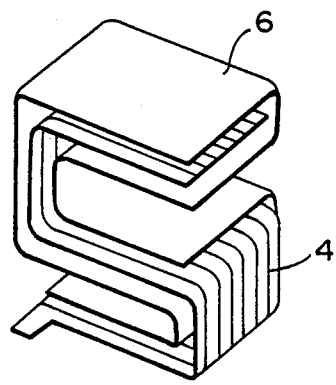
FIG. 5 is a perspective view of a positive electrode and a separator of the thin type battery shown in FIG. 4.
Figure 6:
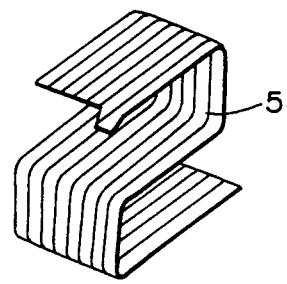
FIG. 6 is a schematic illustration in explanation of a negative electrode of the thin type battery shown in FIG. 4.
Figure 7:
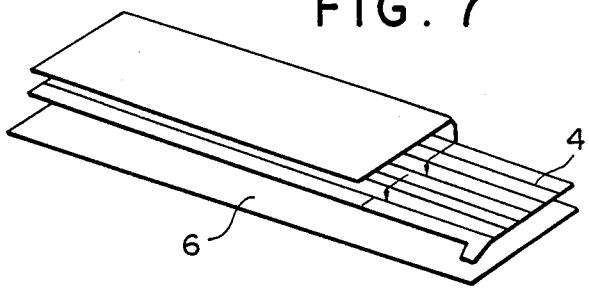
FIG. 7 is a perspective view of the positive electrode covered by the separator before the positive electrode is folded.
Figure 8:
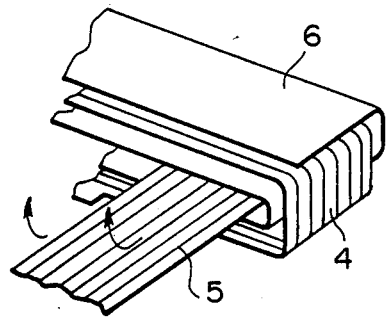
FIGS. 8 and 9 are schematic illustrations in explanation of the steps of folding the positive electrode and the negative electrode in the thin type battery shown in FIG. 4.
Figure 9:
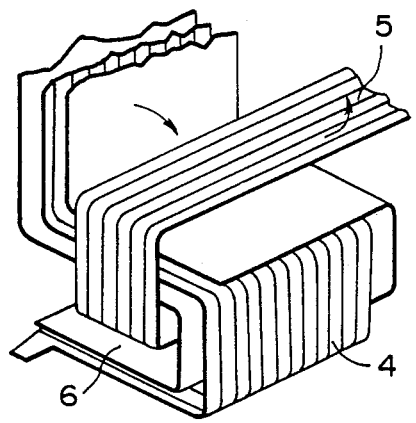
Figure 10:
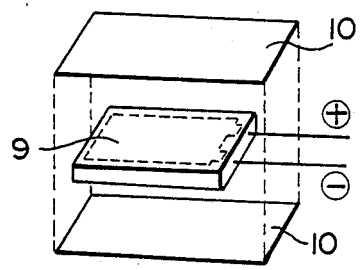
FIG. 10 is a schematic illustration in explanation of the entire structure of the battery shown in FIG. 4.
Figure 11:
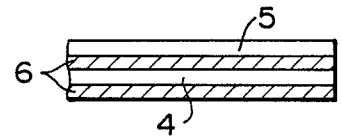
FIG. 11 is a schematic cross-sectional view of a laminated sheet for use in a spiral cylinder type battery as shown in FIG. 12.

With reference to FIGS. 4 to 10, the structures of thin type batteries using a three-folded sheet electrode according to the present invention will now be explained. FIG. 4 is a perspective view of a battery according to the present invention. FIG. 5 is a perspective view of a positive electrode and a separator of the battery in FIG. 4. FIG. 6 is a perspective view of a negative electrode of the battery in FIG. 4. FIGS. 7 to 9 shows the steps of folding the positive electrode and the negative electrode and overlaying the same for constructing the battery in FIG. 4. FIG. 10 is an schematic illustration in explanation of the entire structure of the battery in FIG. 4.

In these figures, reference numeral 4 indicates a sheet-shaped positive electrode; reference numeral 5, a sheet-shaped negative electrode; reference numeral 6, a sheet-shaped separator; reference numeral 7, a negative electrode terminal; reference numeral 8, a positive electrode terminal; reference numeral 9, a laminated body; and reference numeral 10, an outer cover.

In this example, the second electrode according to the present invention, which comprises an aluminum sheet-shaped electrode, both sides of which are coated with an aniline type polymeric active material, is employed as the positive electrode. So long as this electrode is employed as the positive electrode, an electrode comprising a collector coated with the polymeric material on both sides thereof may be employed.

The folding procedure for fabricating the battery shown in FIG. 4 will now be explained, in which a positive electrode covered with a separator 6 and a negative electrode, or a positive electrode, and a negative electrode covered with a separator may be employed. As shown in FIG. 8, both sides of the sheet-shaped positive electrode 4 are covered with the separator 6, except one end portion on one side thereof. The one end portion which is not covered with the separator 6 corresponds to a portion of the end surface of the positive electrode 4 when folded. The area of the uncovered portion may be adjusted as desired. In this case, it is not always necessary that the side portion of the positive electrode 4 be covered with the separator 6.

The thus fabricated positive electrode 4 covered with the separator 6, and sheet-shaped negative electrode 5 are alternatively superimposed so as to cross at right angles as illustrated in FIGS. 9 and 10. In this process, the portion of the sheet-shaped positive electrode 4 which is not covered with the separator 6 is positioned in such a manner that the portion come to the lowermost bottom, and an electrode having a polarity opposite to that of the lowermost electrode 4, that is, the negative electrode, come to the uppermost surface. In this case, the positive electrode 4 is covered with the separator 6, and the negative electrode 5 are followed and laminated, but it is possible to fold and laminate the positive electrode 4 and the negative electrode 5 covered with the separator 5.

It is preferable to dispose the positive and negative electrode terminals of the collector on the opposite side of the respectively corresponding electrodes, whereby it is possible to perform uniform charging and discharging throughout the thus folded battery. However, if the positive and negative electrode terminals are disposed on the same side as that of the respectively corresponding electrodes, uniform charging and discharging throughout the battery cannot be performed, since local charging and discharging are apt to occur, and accordingly, the life and characteristics of the battery vary.

The separator 6 is impregnated with an electrolytic solution of an electrolyte dissolved in a solvent. The impregnation may be carried out either before or after the folding process. It is also possible to impregnate the separator 6 with the electrolytic solution after mounting the same in a battery.

In the secondary batter as shown in FIG. 4, about 5/6 of the 3-folded sheet-shaped positive electrode 4 is covered with the separator 6. In this laminated structure, the positive electrode 4 and the negative electrode 5 are separated by the separator 6, and there are 5 planes in which the positive electrode and negative electrode face each other, with the formation of 11 layers.

Figure 18:
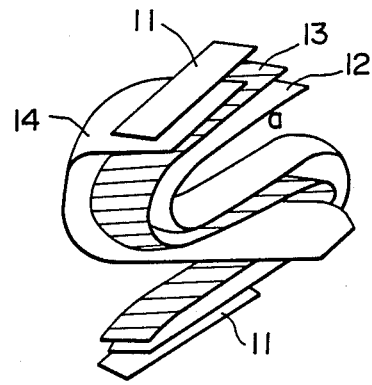
FIG. 18 is a schematic perspective illustration in explanation of the structure of the conventional folded battery as shown in FIG. 17.
Figure 19:
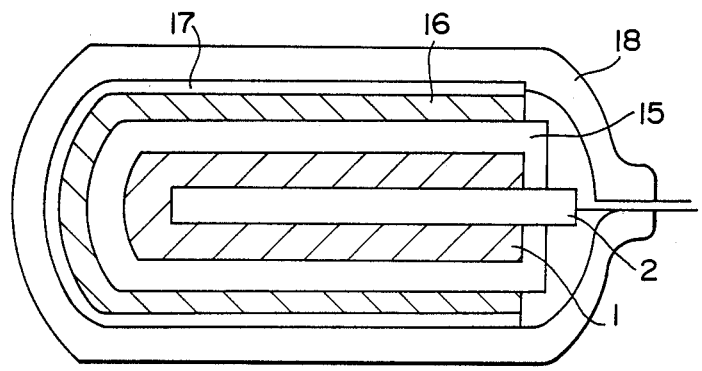
FIG. 19 is a schematic illustration in explanation of another example of a thin type battery according to the present invention.

FIGS. 18 and 19 show a conventional thin type battery. In the figures, reference numeral 11 indicates a collector, with a sheet-shaped positive electrode 12 disposed only on one side thereof which constitutes the battery in combination with a sheet-shaped negative electrode 14 and a separator 13. In FIG. 18, there are 3 planes in which the positive electrode 12 and the negative electrode 14 face each other, with the formation of 10 layers. In comparison with this battery, the battery shown in FIG. 4 has a smaller ratio of the number of the layers to the number of the facing planes of the positive electrode and the negative electrode, so that the battery shown in FIG. 4 constitutes a thin type battery having high energy density.

Figure 17:
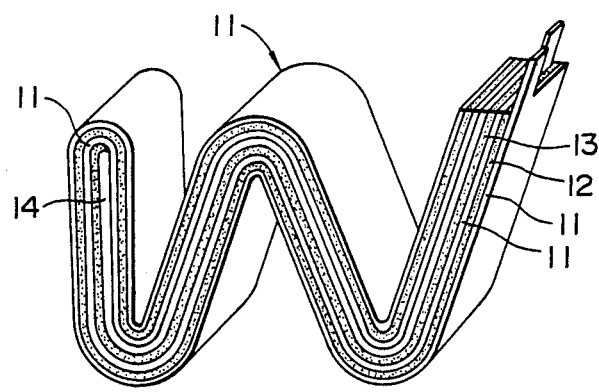
FIG. 17 is a schematic perspective illustration in explanation of a conventional folded battery.

Further in view of the lamination process in FIGS. 7 to 9, the collector in the battery shown in FIG. 4 is more efficiently used than the conventional battery, and only about 5/6 of the active material is covered by the separator 6. More specifically in the structure in FIG. 17, the entire surface of the active material is covered by the separator 13, while in the structure in FIG. 4, the separator corresponding to about 1/6 of the active material can be eliminated. Furthermore, the battery shown in FIG. 4 is better than the conventional battery shown in FIG. 17 and FIG. 18, with respect to the thickness and the weight. Although in the structure shown in FIG. 4, the sheet-shaped electrode is folded three times, the number of the folding is not limited to this in the thin type battery according to the present invention. Namely in accordance with the number of the folding, the area of the sheet-shaped electrode covered by the separator may be adjusted. In other words, the electrode is covered by the separator, except one end portion of the folded electrode.

Figure 12:
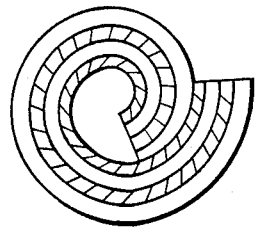
FIG. 12 is a schematic illustration of a spiral cylinder type battery using the laminated sheet as shown in FIG. 11.

FIG. 12 shows a spiral type cylindrical battery utilizing an electrode comprising a collector with a polymeric active material coated on both sides of the collector.

Figure 14:
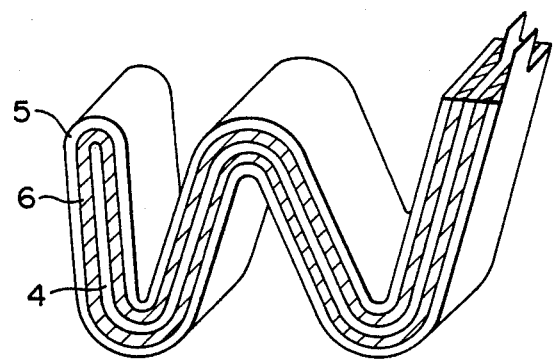
FIG. 14 is a schematic perspective illustration in explanation of a folded battery using the laminated sheet as shown in FIG. 13.
Figure 15:
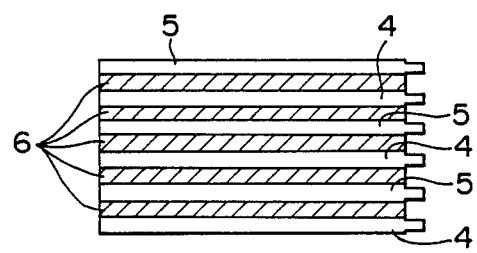
FIG. 15 is a schematic illustration in explanation of a laminated type battery according to the present invention.

FIG. 14 shows a folded type battery utilizing the same electrode as that employed in the battery shown in FIG. 12.

In FIG. 12, the separator 6, the sheet-shaped positive electrode 4, the separator 6, and the sheet-shaped negative electrode 5 are successively laminated and rolled with the separator 6 positioned inside.

Figure 13:
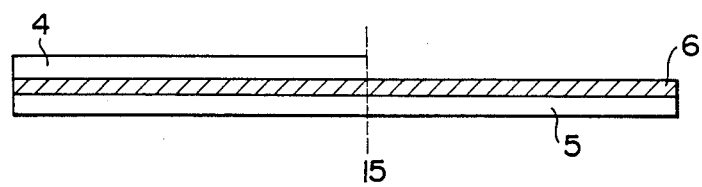
FIG. 13 is a schematic illustration of a laminated sheet for use in a folded battery as shown in FIG. 14.

The folded type battery shown in FIG. 14 is fabricated by laminating the sheet-shaped negative electrode 5, the separator 6, and the positive electrode 4 having a half length of the negative electrode 5 and the separator 6, and folding the separator 6 and the sheet-shaped negative electrode 5 at the dot line 15 as shown in FIG. 13 in such a manner that the positive electrode 4 comes inside in the shape of an accordion as shown in FIG. 14. When the sheet-shaped positive electrode 4 and the sheet-shaped negative eletrode 5 are alternatively laminated through the separator 6 to form a multiple layer structure as shown in FIG. 14, a battery having high release voltage can be obtained when the electrodes are connected in series.

Further, according to the present invention, a secondary battery in which a solid electrolyte is employed instead of a separator and an electrolyte solution can be provided as shown in FIG. 19. In the figure, reference numeral 15 indicates a solid electrolyte; reference numeral 16, a negative electrode active material; reference numeral 17, a negative electrode collector 17; and reference numeral 18, a wrapping material.

Figure 16:
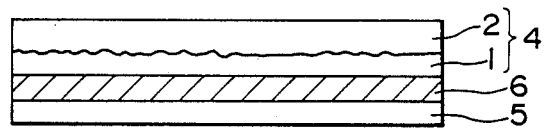
FIG. 16 is a schematic illustration in explanation of a thin type battery according to the present invention.

Even when a roughened surface treated aluminum collector with an alinine type polymeric active material coated on one side thereof is used, a thin type battery with high reliability and high collector efficiency can be obtained, by disposing a sheet-shaped positive electrode 4 with a collector 2 directed to the outside and an aniline type polymeric active material 1 inside, in such a manner as to face a sheet-shaped negative electrode 5, with a separator 6 interposed therebetween as shown in FIG. 16.

The necessary elements for the secondary battery will now be explained. As the positive electrode, the aluminum collector-aniline type polymeric active material collector according to the present invention is employed. As the negative electrode active material, electroconductive polymers, alloys of Li and Al, Li and Mg, Li and Pb, Li and Si, Li and Ga, and Li and In, can be employed. As the negative electrode, a sheet-shaped negative active material can be solely. However, for improvement of the handling convenience and the collection efficiency, a composite electrode comprising the above-mentioned negative electrode active material and the collector may be preferably employed.

As the materials for the negative electrode collector, Ni, Al, Cu, Pt, Au and stainless steel are preferably employed. Of these, Al is more preferable from the viewpoint of the weight lightening point of the negative electrode. Conventionally, an Al-Li alloy is employed for the negative electrode for the prevention of the formation of dendrite. However, it is not always necessary for the Al and Li be in the form of an alloy.

The methods available for laminating the negative electrode active material on the negative electrode collector are a method of forming a negative electrode active material layer on the negative electrode collector by the vacuum deposition or electrochemical method, and a mechanical method of applying an active material such as Li to the collector.

In the electrochemical method, a negative electrode collector itself, for example, Li may be deposited as an electrode. However, when an active material such as Li is electrochemically deposited on a negative electrode collector which is coated with an ion conductive polymer, such an active material can be uniformly deposited on the negative electrode collector.

In the mechanical method of applying an active material to the collector, a sandwich type structure in which a collector is held between the negative electrode materials may be used. In addition to this, there can be employed a structure in which a perforated collector with holes having a size of 0.2 to 10 $cm^2$ is cladded with Li or a Li alloy in such a manner as to be able to use the surface of the collector.

The thickness of the negative electrode can be chosen as desired, but generally it is in the range of about 3 $\mu$m to 300 $\mu$m, preferably in the range of about 10 $\mu$m to 200 $\mu$m, in view of the self-standing property and the flexibility necessary for the electrode.

The electrolytes (dopants) of an electrolytic solution of the battery are, for example, anions and cations. A polymer complex doped with a cation is an n-type electroconductive polymer, while a polymer complex doped with an anion is a p-type electroconductive polymer. The aniline type polymeric materials for use in the present invention are p-type electroconductive polymers. The polymer complexes doped with an anion can be employed for a positive electrode, and the polymer complexes doped with a cation can be employed for a negative electrode.

(1) Anions: halogenated anions of Va group elements, such as $PF_6^-$, $SbF_6^-$, $AsF_6^-$, and $SbCl_6^-$; halogenated anions of IIIa group elements, such as $BF_4^-$ and $BR_4^-$ (where R is phenyl or alkyl); and perchloric acid anions such as $ClO_4^-$.

(2) Cations: Alkali metal ions such as $Li^+$, $Na^+$, and $K^+$; and $(R_4N)^+$ (where R is a hydrocarbon group having 1 to 20 carbon atoms).

Specific compounds capable of providing the above dopants are $LiPF_6$, $LiSbF_6$, $LiAsF_6$, $LiClO_4$, $NaClO_4$, KI, $KPF_6$, $KSbF_6$, $KAsF_6$, $KClO_4$, $[(n-Bu)_4]^+AsF_6$, $[(n-Bu)_4]^+ClF_6$, $LiAlCl_4$, and $LiBF_4$.

Preferable solvents for an electrolytic solution of the battery are polar non-protonic solvents which are non-protonic solvents and have large dielectric constants. Specific examples of such solvents are ketones, nitriles, esters, ethers, carbonates, nitro compounds, sulfolane type compounds, and mixtures of the above solvents. Representative examples of the solvents are ethylene carbonate, propylene carbonate, $\gamma$-butyrolactone, sulfolane, 3-methylsulfolane, 2-methyl tetrahydrofuran, dimethoxyethane, diethoxyethane, and dimethyl-formamide. Of these solvents, ethers, carbonates and sulfolane compounds are more preferable for use in the electrolytic solution.

It is preferable that the separator for use in the present invention be made of an electric insulating material, and resistant to chemicals, excellent in mechanical strength, flexible, have numerous fine pores and excellent in capability of holding an electrolytic solution. In the present invention, conventionally employed filters, such as glass fiber filter; polymeric porefilters made of, for example, nylon, polyester, teflon, polyflon, polypropylene, and polyolefines; glass fiber; and unwoven fabrics made of the above polymeric materials, can be employed. It is preferable that the separator be in the form of a sheet and thin from the viewpoint of energy density, with a thickness of 100 $\mu$m or less.

Solid electrolytes may be employed instead of the electrolytic solution and the separator. Such solid electrolytes may also be employed in combination with the electrolytic solution and the separator.

The solid electrolytes for use in the present invention are, for example, halogenated metals such as AgCl, AgBr, AgI, and LiI; ceramics such as $RbAg_4I_4CN$, LISICON glass, and NASICON glass, which are respectively lithium-ion and sodium-ion electroconductive glasses; glass; sheet-shaped composite solid electrolyte layers comprising a rubber-like elastic material and any of the above materials dispersed in the elastic material; and the previously mentioned polymeric solid electrolytes. The polymeric solid electrolytes are preferable for use in the present invention.

With reference to the following examples, the present invention will now be explained in more detail. These examples are given for the purpose of illustration of the present invention and are not intended to be limiting thereof.

EXAMPLE 1-1

Preparation of Electrode No. 1

The surface of a 40 $\mu$m thick etched aluminum sheet (negative electrode foil) for use in a condenser was sufficiently roughened by use of a CC 1000 Cw emery sheet, whereby a working electrode was prepared.

The thus prepared working electrode, a counter electrode made of platinum, and a saturated calomel electrode (SCE) serving as a reference electrode were immersed in an aqueous solution of 0.5M aniline and 5.5N sulfuric acid for polymerization. Thus, constant-potential polymerization of the aniline was performed at a potential of 0.8 V vs. SCE, whereby a polyaniline film was deposited on both sides of the aluminum sheet.

The thus deposited polyaniline films were washed with water and subsequently with acetonitrile, and dried. Thus, Electrode No. 1 according to the present invention was prepared.

The aniline was uniformly polymerized and the formed polyaniline films did not peel off the etched aluminum sheet.

EXAMPLE 1-2

Preparation of Electrode No. 2

The surface of an aluminum sheet with a purity of 99% was sufficiently roughened by use of a CC 1500 Cw emery sheet, whereby a working electrode was prepared.

The thus prepared work electrode, a counter electrode made of platinum, and a saturated calomel electrode (SCE) serving as a reference electrode were immersed in an aqueous solution of 0.5M aniline and 1.5N sulfuric acid for polymerization. Thus, constant-potential polymerization of the aniline was performed at a potential of 0.8 V vs. SCE, whereby a polyaniline film was deposited on both sides of the aluminum sheet.

The thus deposited polyaniline films were washed with water and subsequently with acetonitrile, and dried. Thus, Electrode No. 2 according to the present invention was prepared.

The aniline was uniformly polymerized and the formed polyaniline films did not peel off the etched aluminum sheet.

EXAMPLE 1-3

Preparation of Electrode No. 3

The procedure of Example 1-1 was repeated except that the 5.5N sulfuric acid employed in Example 1 was replaced by a 1.5N sulfuric acid and the constant-potential polymerization was performed at a potential of 1.2 V vs SCE, whereby a polyaniline film was deposited on both sides of the aluminum sheet.

The thus deposited polyaniline films were washed with water and subsequently with acetonitrile, and dried. Thus, Electrode No. 3 according to the present invention was prepared.

The aniline was uniformly polymerized and the formed polyaniline films did not peel off the etched aluminum sheet.

EXAMPLE 1-4

Preparation of Electrode No. 4

The surface of an aluminum sheet with a purity of 99% was sufficiently roughened by use of a CC 500 Cw emery sheet, whereby a work electrode was prepared.

The thus prepared work electrode, a counter electrode made of platinum, and a saturated calomel electrode (SCE) serving as a reference electrode were immersed in an aqueous solution of 0.5M aniline and 1.5M p-toluene sulfonic acid for polymerization. Thus, constant-potential polymerization of the aniline was performed at a potential of 1.0 V vs. SCE. As a result, a dark green polyaniline film was deposited on both sides of the aluminum sheet.

The thus deposited polyaniline films were washed with water and subsequently with acetonitrile, and dried. Thus, Electrode No. 4 according to the present invention was prepared.

The aniline was uniformly polymerized and the formed polyaniline films did not peel off the aluminum sheet.

EXAMPLE 1-5

Preparation of Electrode No. 5

An etched aluminum foil with a purity of 99.5% was prepared by use of an aqueous etching solution of 1.5N hydrochloric acid, 0.3M oxalic acid, and 0.3M aluminum chloride, and an Au counter electrode, with application of an alternate electric current of ±3 V and 3 Hz for 2 minutes.

The thus prepared etched aluminum foil, using as a work electrode, a counter electrode made of platinum, and a saturated calomel electrode (SCE) serving as a reference electrode were immersed in an aqueous solution of 0.5M aniline and 3.5N sulfuric acid for polymerization. Thus, constant-potential polymerization of the aniline was performed at a potential of 1.2 V vs. SCE. As a result, a dark green polyaniline film was deposited on both sides of the aluminum foil.

The thus deposited polyaniline films were washed with water and subsequently with acetonitrile, and dried, whereby Electrode No. 5 according to the present invention was prepared.

The aniline was uniformly polymerized and the formed polyaniline films did not peel off the aluminum foil.

EXAMPLE 1-6

Preparation of Electrode No. 6

The same etched aluminum foil as that prepared in Example 5, using as a working electrode, a counter electrode made of platinum, and a saturated calomel electrode (SCE) serving as a reference electrode were immersed in an aqueous solution of 0.5M aniline and 1.5N sulfuric acid for polymerization. Thus, constant-potential polymerization of the aniline was performed at a potential of 1.0 V vs. SCE. As a result, a dark green polyaniline film was deposited on both sides of the aluminum foil.

The thus deposited polyaniline films were washed with water and subsequently with acetonitrile, and dried, whereby Electrode No. 6 according to the present invention was prepared.

The aniline was uniformly polymerized and the formed polyaniline films did not peel off the aluminum foil.

EXAMPLE 1-7

Preparation of Electrode No. 7

An aluminum sheet with a purity of 99% was subjected to a blast treatment by using 220-mesh emery particles with application of a pressure of 3 kg/cm$^2$, whereby a working electrode was prepared.

The thus prepared working electrode, a counter electrode made of platinum, and a saturated calomel electrode (SCE) serving as a reference electrode were immersed in an aqueous solution of 0.5M aniline and 1.5N sulfuric acid for polymerization. Thus, constant-potential polymerization of the aniline was performed at a potential of 1.2 V vs. SCE, whereby a dark green polyaniline film was deposited on both sides of the aluminum sheet.

The thus deposited polyaniline films were washed with water and subsequently with acetonitrile, and dried. Thus, Electrode No. 7 according to the present invention was prepared.

The aniline was uniformly polymerized and the formed polyaniline films did not peel off the aluminum sheet.

EXAMPLE 1-8

Preparation of Electrode No. 8

The surface of a 40 μm thick etched aluminum sheet (negative electrode foil) for use in a condenser was sufficiently roughened by use of a CC 1500 Cw emery sheet, whereby a working electrode was prepared.

The thus prepared working electrode, a counter electrode made of platinum, and a saturated calomel electrode (SCE) serving as a reference electrode were immersed in an aqueous solution of 0.5M aniline and 1.5N sulfuric acid for polymerization. Thus, constant-potential polymerization of the aniline was performed at a potential of 1.2 V vs. SCE, whereby a polyaniline film was deposited on both sides of the aluminum sheet.

The thus deposited polyaniline films were washed with water and subsequently with acetonitrile, and dried. Thus, Electrode No. 8 according to the present invention was prepared.

The aniline was uniformly polymerized and the formed polyaniline films did not peel off the etched aluminum sheet.

EXAMPLE 1-9

Preparation of Electrode No. 9

An 50 μm etched aluminum foil with a purity of 99.5% prepared in the same manner as in Example 1-5, using as a working electrode, and a counter electrode made of platinum were immersed in an aqueous solution of 0.5M aniline and 3.5N sulfuric acid for polymerization. Thus, constant-current polymerization of the aniline was performed at a constant current of 10 mA/cm$^2$. As a result, a dark green polyaniline film having a thickness of 30 μm was deposited on both sides of the aluminum foil.

The thus deposited polyaniline films were washed with water and subsequently with acetonitrile, and dried, whereby Electrode No. 9 according to the present invention was prepared.

The aniline was uniformly polymerized and the formed polyaniline films did not peel off the aluminum foil.

EXAMPLE 1-10

Preparation of Electrode No. 10

The same etched aluminum foil as that prepared in Example 1-5, using as a work electrode, a counter electrode made of platinum, and a saturated calomel electrode (SCE) serving as a reference electrode were immersed in an aqueous solution of 0.5M aniline and 3.5N sulfuric acid for polymerization. Thus, constant-potential polymerization of the aniline was performed at a potential of 0.8 V vs. SCE. As a result, a dark green polyaniline film was deposited on both sides of the aluminum foil.

The thus deposited polyaniline films were washed with water and subsequently with acetonitrile, and dried, whereby Electrode No. 10 according to the present invention was prepared.

The aniline was uniformly polymerized and the formed polyaniline films did not peel off the aluminum foil.

EXAMPLE 1-11

Preparation of Electrode No. 11

An aluminum sheet with a purity of 99% was subjected to a blast treatment by using 200-mesh emery particles with application of a pressure of 2 kg/cm$^2$, whereby a working electrode was prepared.

The thus prepared working electrode, a counter electrode made of platinum, and a saturated calomel electrode (SCE) serving as a reference electrode were immersed in an aqueous solution of 0.5M aniline and 1.5M p-toluene sulfonic acid for polymerization. Thus, constant-potential polymerization of the aniline was performed at a potential of 1.0 V vs. SCE, whereby a dark green polyaniline film was deposited on both sides of the aluminum sheet.

The thus deposited polyaniline films were washed with water and subsequently with acetonitrile, and dried. Thus, Electrode No. 11 according to the present invention was prepared. The aniline was uniformly polymerized and the formed polyaniline films did not peel off the aluminum sheet.

EXAMPLE 1-12

Preparation of Electrode No. 12

The surface of an aluminum sheet with a purity of 99% was sufficiently roughened by use of a CC 1000 Cw emery sheet, whereby a working electrode was prepared.

The thus prepared working electrode, a counter electrode made of platinum, and a saturated calomel electrode (SCE) serving as a reference electrode were immersed in an aqueous solution of 0.5M aniline and 1.5M trifluoroacetic acid for polymerization. Thus, constant-potential polymerization of the aniline was performed at a potential of 1.2 V vs. SCE, whereby a polyaniline film was deposited on both sides of the aluminum sheet.

The thus deposited polyaniline films were washed with water and subsequently with acetonitrile, and dried. Thus, Electrode No. 12 according to the present invention was prepared.

The aniline was uniformly polymerized and the formed polyaniline films did not peel off the etched aluminum sheet.

EXAMPLE 1-13

Preparation of Electrode No. 13

An aluminum sheet with a purity of 99.5% was subjected to a blast treatment by using 750-mesh emery particles with application of a pressure of 3 kg/cm$^2$, whereby a working electrode was prepared.

The thus prepared working electrode, a counter electrode made of platinum, and a saturated calomel electrode (SCE) serving as a reference electrode were immersed in an aqueous solution of 0.5M aniline and 1.5N sulfuric acid for polymerization. Thus, constant-potential polymerization of the aniline was performed at a potential of 0.8 V vs. SCE, whereby a dark green polyaniline film was deposited on both sides of the aluminum sheet.

The thus deposited polyaniline films were washed with water and subsequently with acetonitrile, and dried. Thus, Electrode No. 13 according to the present invention was prepared.

The aniline was uniformly polymerized and the formed polyaniline films did not peel off the aluminum sheet.

EXAMPLE 1-14

Preparation of Electrode No. 14

A 50 μm thick aluminum sheet with a purity of 99.5% was subjected to an alternate current etching, whereby a working electrode was prepared.

The thus prepared working electrode, a counter electrode made of platinum, and a saturated calomel electrode (SCE) serving as a reference electrode were immersed in an aqueous solution of 0.5M aniline and 3.5N sulfuric acid for polymerization. Thus, constant-potential polymerization of the aniline was performed at a potential of 1.2 V vs. SCE, whereby a dark green polyaniline film was deposited on both sides of the aluminum sheet.

The thus deposited polyaniline films were washed with water and subsequently with acetonitrile, and dried. Thus, Electrode No. 14 according to the present invention was prepared.

The aniline was uniformly polymerized and the formed polyaniline films did not peel off the aluminum sheet.

EXAMPLE 1-15

Preparation of Electrode No. 15

The same aluminum sheet as that employed in Example 1-2, using as a working electrode, a counter electrode made of platinum, and a saturated calomel electrode (SCE) serving as a reference electrode were immersed in an aqueous solution of 0.5M aniline, and 1.5N sulfuric acid for polymerization. Thus, constant-potential polymerization of the aniline was performed at a potential of 0.8 V vs. SCE, whereby a dark green polyaniline film was deposited on both sides of the aluminum sheet, with a total thickness of 40 $\mu$m.

The thus deposited polyaniline films were washed with water and subsequently with acetonitrile, and dried, whereby a composite positive electrode was prepared.

This composite positive electrode and a negative electrode of Ni were immersed in a solution of 0.1M pyrrole and 0.05M tetramethylammonium p-toluene sulfonate dissolved in acetonitrile, so that constant-voltage polymerization of the pyrrole was performed at a constant voltage of 4 V, with a quantity of electricity of 0.5 C/cm$^2$. Thus, a composite electrode of Al-polyaniline-polypyrrole was obtained, which is referred to as Electrode No. 15 according to the present invention was prepared.

Electrode No. 15 was subjected to a bending test by bending the electrode around a cylinder having a diameter of 6 mm by an angle of 90° and repeating such bending 40 times, and the polymeric layer of the composite electrode opposite to the side in contact with the cylinder was visually inspected. The result was that there were neither cracks nor peeled-off portions in the polymeric layer.

EXAMPLE 16

Preparation of Electrode No. 16

The same composite electrode of Al-polyanilinepolypyrrole as that employed in Example 1-15, using as a positive electrode, and a negative electrode of Ni were immersed in a solution of 0.05M furan and 0.2M LiClO$_4$ dissolved in benzonitrile, so that constant-voltage polymerization of the furan was performed at a constant voltage of 6.5 V, with a quantity of electricity of 0.5 C/cm$^2$. Thus, a composite electrode of Al-fibril-shaped polyaniline-polyfuran was obtained, which is referred to as Electrode No. 16 according to the present invention was prepared.

Electrode No. 16 was subjected to the same bending test as in Example 1-15. The result was that there were neither cracks nor peeled-off portions in the polymeric layer.

EXAMPLE 17

Preparation of Electrode No. 17

The surface of a 80 $\mu$m thick polyester film was roughened by use of CC 7000 Cw emery sheet. Aluminum was then deposited in vacuum on this polyester film, whereby an aluminum-deposited polyester composite working electrode with a size of 16 mm$\times$90 mm was prepared.

The thus prepared working electrode, a counter electrode made of platinum, and a saturated calomel electrode (SCE) serving as a reference electrode were immersed in an aqueous solution of 0.5M aniline and 1.5N sulfuric acid for polymerization. Thus, constant-potential polymerization of the aniline was performed at a potential of 0.8 V vs. SCE, whereby a dark green polyaniline film was deposited on both sides of the aluminum-deposited polyester composite electrode.

The thus deposited polyaniline films were washed with water and subsequently with acetonitrile, and dried. Thus, Electrode No. 17 according to the present invention was prepared. The entire weight of the composite electrode was 170 mg. The composite electrode was then subjected to a bending test by use of a MIT-type tester. The result was that it was not broken even when the bending was repeated more than 400 times.

PREPARATION OF NEGATIVE ELECTRODE NO. 1

The both sides of a 10 $\mu$m thick nickel foil were sufficiently roughened by a CC 100 Cw emery sheet, and then cladded with a 50 $\mu$m thick lithium foil with application of pressure to prepare an integrated negative electrode No. 1.

PREPARATION OF NEGATIVE ELECTRODE NO. 2

The both sides of a 10 $\mu$m thick nickel foil were sufficiently roughened by a CC 100 Cw emery sheet, and then perforated, with the formation of holes having a diameter of 0.5 mm at a density of 200 holes/cm$^2$. One side of the thus perforated nickel foil was cladded with a 100 $\mu$m thick Li-Al alloy (weight ratio 7:3) with application of pressure to prepare an integrated negative electrode No. 2.

EXAMPLE 2-1

Preparation of Battery No. 1

A thin type battery as shown in FIG. 4 was prepared by use of Electrode No. 1 prepared in Example 1 as a positive electrode including a polyaniline layer having a thickness of 40 $\mu$m.

As the negative electrode for this battery, the integrated negative battery No. 1 was employed.

As the separator, a polypropylene pore filter (max. pore size 0.02$\times$0.2 $\mu$m) to which a polypropylene nonwoven fabric was applied for improving the liquid retention property, having a thickness of 75 $\mu$m, which is commercially available from Polyplastics Company, Ltd. under the trademark of "Duragard", was employed.

Further, the electrolyte liquid, a solution of 3.5M LiBF$_4$ dissolved in a mixed solvent of propylene carbonate and dimethoxyethane (7:3) was employed.

The external cover for the battery was constructed of a 100 $\mu$m thick 4-layered thermal adhesive layer of polyester/aluminum/nylon/polypropylene.

The electrolyte liquid was injected into the battery after it was constructed through a syringe, and the peripheral portions of the battery were sealed by heat and pressure application bonding, whereby a battery No. 1 having a size of 50 mm$\times$50 mm$\times$0.9 mm according to the present invention was prepared.

The thus prepared battery No. 1 was subjected to a charging and discharging test with a constant current of 1 mA.

EXAMPLE 2-2

Preparation of Battery No. 2

Example 2-1 was repeated except that the electrode employed as the positive electrode in Example 2-1 was replaced by the electrode prepared in Example 1-13, whereby a battery No. 2 according to the present invention was prepared.

The thus prepared battery No. 2 was subjected to the same charging and discharging test as in Example 2-1.

EXAMPLE 2-3

Preparation of Battery No. 3

Example 2-1 was repeated except that the electrode employed as the positive electrode in Example 2-1 was replaced by the electrode prepared in Example 1-5, whereby a battery No. 3 according to the present invention was prepared.

The thus prepared battery No. 3 was subjected to the same charging and discharging test as in Example 2-1.

EXAMPLE 2-4

Preparation of Battery No. 4

Example 2-1 was repeated except that the electrode employed as the positive electrode in Example 2-1 was replaced by the electrode prepared in Example 1-7, and the negative electrode employed in Example 2-1 was replaced by the negative electrode No. 2, whereby a battery No. 4 according to the present invention was prepared.

The thus prepared battery No. 4 was subjected to the same charging and discharging test as in Example 2-1.

EXAMPLE 2-5

Preparation of Battery No. 5

Example 2-1 was repeated except that the electrode employed as the positive electrode in Example 2-1 was replaced by the electrode prepared in Example 1-8, whereby a battery No. 5 according to the present invention was prepared.

The thus prepared battery No. 5 was subjected to the same charging and discharging test as in Example 2-1.

EXAMPLE 2-6

Preparation of Battery No. 6

Example 2-4 was repeated except that the electrode employed as the positive electrode in Example 2-4 was replaced by the electrode prepared in Example 1-11, whereby a battery No. 6 according to the present invention was prepared.

The thus prepared battery No. 6 was subjected to the same charging and discharging test as in Example 2-1.

EXAMPLE 2-7

Preparation of Battery No. 7

Example 2-1 was repeated except that the electrode employed as the positive electrode in Example 2-1 was replaced by the electrode prepared in Example 1-4, and the electrolyte liquid employed in Example 2-1 was replaced by an electrolyte liquid of 1.5M LiPF$_6$ dissolved in propylene carbonate, whereby a battery No. 7 according to the present invention was prepared.

The thus prepared battery No. 7 was subjected to the same charging and discharging test as in Example 2-1.

EXAMPLE 2-8

Preparation of Battery No. 8

Example 2-7 was repeated except that the electrode employed as the positive electrode in Example 2-7 was replaced by the electrode prepared in Example 1-12, whereby a battery No. 8 according to the present invention was prepared.

The thus prepared battery No. 8 was subjected to the same charging and discharging test as in Example 2-1.

EXAMPLE 2-9

Preparation of Battery No. 9

Example 2-7 was repeated except that the electrode employed as the positive electrode in Example 2-7 was replaced by the electrode prepared in Example 1-2, whereby a battery No. 9 according to the present invention was prepared.

The thus prepared battery No. 9 was subjected to the same charging and discharging test as in Example 2-1.

EXAMPLE 2-10

Preparation of Battery No. 10

A thin type battery with a size of 3 cm×3 cm was prepared by use of Electrode No. 3 prepared in Example 1-3 as a positive electrode including 50 mg of the polyaniline active material.

As the negative electrode for this battery, a negative electrode prepared by cladding a 10 μm thick aluminum foil with a lithium layer with a thickness of 80 μm was employed.

As the separator, the commercially available separator (Trademark "Duragard" made by Polyplastics Company, Ltd.) (employed in Example 2-1) was employed, which was impregnated with a propylene carbonate and dimethoxyethylene (7:3) solution of 1M LiBF$_4$. This separator was disposed between the polyester - Al polyethylene laminated films for use as the external cover of the battery, and the polyester - Al polyethylene laminated films were sealed with application of heat and pressure. The external electrodes of this battery were extracted by welding Ni wires to the collectors of the electrodes, whereby Battery No. 10 according to the present invention was prepared.

The thus prepared battery No. 10 was subjected to a charging and discharging test with a constant current of 1 mA.

EXAMPLE 2-11

Preparation of Battery No. 11

Example 2-10 was repeated except that the electrode employed as the positive electrode in Example 2-10 was replaced by the electrode prepared in Example 1-10, whereby a battery No. 11 according to the present invention was prepared.

The thus prepared battery No. 11 was subjected to the same charging and discharging test as in Example 2-10.

EXAMPLE 2-12

Preparation of Battery No. 12

Example 2-10 was repeated except that the electrode employed as the positive electrode in Example 2-10 was replaced by the electrode prepared in Example 1-6, whereby a battery No. 12 according to the present invention was prepared.

The thus prepared battery No. 12 was subjected to the same charging and discharging test as in Example 2-10.

EXAMPLE 2-13

Preparation of Battery No. 13

A thin type battery with a size of 40 mm×40 mm×0.6 mm was prepared by use of Electrode No. 13 prepared in Example 1-13 as a positive electrode including a 30 μm thick active material layer.

As the negative electrode for this battery, a negative electrode prepared by cladding a 10 μm thick nickel foil with a lithium layer with a thickness of 80 μm was employed.

As the separator, the commercially available separator (Trademark "Duragard" made by Polyplastics Company, Ltd.) (employed in Example 2-1) having a thickness of 75 μm was employed, which was impregnated with a propylene carbonate and dimethoxyethylene (7:3) solution of 1M LiBF$_4$. This separator was disposed between the polyester - Al polyethylene laminated films for use as the external cover of the battery, and the polyester - Al polyethylene laminated films were sealed with application of heat and pressure. The external electrodes of this battery were extracted by welding Ni wires to the collectors of the electrodes, whereby Battery No. 13 according to the present invention was prepared.

The thus prepared battery No. 13 was subjected to a charging and discharging test with a constant current of 1 mA.

EXAMPLE 2-14

Preparation of Battery No. 14

Example 2-13 was repeated except that the electrode employed as the positive electrode in Example 2-13 was replaced by the electrode prepared in Example 1-14, whereby a battery No. 14 according to the present invention was prepared.

The thus prepared battery No. 14 was subjected to the same charging and discharging test as in Example 2-13.

COMPARATIVE EXAMPLE 1-1

Preparation of Comparative Electrode No. 1

Example 1-1 was repeated except that the sulfuric acid employed in Example 1-1 was replaced by HCl. The result was that the aluminum was completely dissolved in the solution for polymerization and no polyaniline was synthesized.

COMPARATIVE EXAMPLE 1-2

Preparation of Comparative electrode No. 2

Example 1-1 was repeated except that the sulfuric acid employed in Example 1-1 was replaced by HClO$_4$. The result was that the aluminum was completely dissolved in the solution for polymerization and no polyaniline was synthesized.

COMPARATIVE EXAMPLE 1-3

Preparation of Comparative Electrode No. 3

Example 1-1 was repeated except that the sulfuric acid employed in Example 1-1 was replaced by HBF$_4$. The result was that no polyaniline was synthesized even when the quantity of electricity that flowed was 20 C/cm$^2$.

COMPARATIVE EXAMPLE 1-4

Preparation of Comparative Electrode No. 4

Example 1-1 was repeated except that the working electrode employed in Example 1-1 was replaced by a brightening aluminum electrode which was prepared by immersing a 40 μm thick aluminum sheet with a purity of 99% in a 5% aqueous solution of sodium hydroxide for 10 minutes and then washing the same. The result was that no polyaniline was synthesized even when the quantity of electricity that flowed was 20 C/cm$^2$.

COMPARATIVE EXAMPLE 2-1

Preparation of Comparative Battery No. 1

Example 1-1 was repeated except that the etched aluminum sheet roughened by the emery sheet in Example 1-1 was replaced by a 40 μm thick aluminum sheet with a purity of 99% without being subjected to the surface roughening treatment. The result was that polyaniline was synthesized non-uniformly locally near an end portion of the aluminum electrode.

Example 2-1 was repeated except that the positive electrode employed in Example 2-1 was replaced by the above prepared electrode, whereby a comparative battery No. 1 was prepared.

The thus prepared comparative battery No. 1 was subjected to the same performance test as in Example 2-1.

COMPARATIVE EXAMPLE 2-2

Preparation of Comparative Battery No. 2

Example 1-1 was repeated except that the etched aluminum sheet roughened by the emery sheet in Example 1-1 was replaced by a 40 μm thick nickel foil which was subjected to the surface roughening treatment by use of a CC 1000 Cw emery sheet.

Example 2-1 was repeated except that the positive electrode employed in Example 2-1 was replaced by the above prepared electrode, whereby a comparative battery No. 2 was prepared.

The thus prepared comparative battery No. 2 was subjected to the same performance test as in Example 2-1.

COMPARATIVE EXAMPLE 2-3

Preparation of Comparative Battery No. 3

Example 2-4 was repeated except that the positive electrode employed in Example 2-4 was replaced by a 20 μm thick Au foil, whereby a comparative battery No. 3 was prepared.

The thus prepared comparative battery No. 3 was subjected to the same performance test as in Example 2-4.

COMPARATIVE EXAMPLE 2-4

Preparation of Comparative Battery No. 3

Example 2-10 was repeated except that the positive electrode employed in Example 2-10 was replaced by a 20 μm thick Au foil, whereby a comparative battery No. 4 was prepared.

The thus prepared comparative battery No. 4 was subjected to the same performance test as in Example 2-10.

COMPARATIVE EXAMPLE 2-5

Preparation of Comparative Battery No. 5

Example 1-1 was repeated except that the etched aluminum sheet roughened by the emery sheet in Example 1-1 was replaced by a 40 μm thick stainless steel foil which was subjected to the surface roughening treatment by use of a CC 100 Cw emery sheet, whereby a comparative electrode was prepared.

Example 2-10 was repeated except that the positive electrode employed in Example 2-10 was replaced by the above prepared comparative electrode, whereby a comparative battery No. 5 was prepared.

The thus prepared comparative battery No. 4 was subjected to the same performance test as in Example 2-10.

The results of the performance tests of the batteries according to the present invention and the comparative batteries are summarized in the following Table 1:

TABLE 1

| | Positive Electrode | Negative Electrode | Electrode Liquid | Open-circuit Voltage (V) | Discharging Capacity (mAh) |
|---|---|---|---|---|---|
| Example 2-1 | Example 1-1 | Li | 3.5 M LiBF$_4$ (PC + DME) | 3.7 | 9.1 |
| Example 2-2 | Example 1-13 | Li | 3.5 M LiBF$_4$ (PC + DME) | 3.7 | 8.7 |
| Example 2-3 | Example 1-5 | Li | 3.5 M LiBF$_4$ (PC + DME) | 3.7 | 9.0 |
| Comparative Example 2-1 | Comparative Example 2-1 | Li | 3.5 M LiB$_4$F/PC | 3.5 | 2.1 |
| Comparative Example 2-2 | Comparative Example 2-2 | Li | 3.5 M LiB$_4$/PC | 3.7 | 10.1 |
| Example 2-4 | Example 1-7 | Li—Al | 3.5 M LiBF$_4$ (PC + DME) | 3.2 | 7.9 |
| Example 2-5 | Example 1-8 | Li—Al | 3.5 M LiBF$_4$ (PC + DME) | 3.2 | 8.3 |
| Example 2-6 | Example 1-11 | Li—Al | 3.5 M LiBF$_4$ (PC + DME) | 3.2 | 7.9 |
| Comparative Example 2-3 | Comparative Example 2-3 | Li—Al | 3.5 M LiBF$_4$/PC | 3.2 | 9.4 |
| Example 2-7 | Example 1-4 | Li | 1.5 M LiPF$_6$/PC | 3.65 | 7.8 |
| Example 2-8 | Example 1-12 | Li | 1.5 M LiPF$_6$/PC | 3.65 | 7.3 |
| Example 2-9 | Example 1-2 | Li | 1.5 M LiPF$_6$/PC | 3.65 | 7.9 |
| Example 2-10 | Example 1-3 | Li | 1.0 M LiBF$_4$ (PC + DME) | 3.6 | 5.0 |
| Example 2-11 | Example 1-10 | Li | 1.0 M LiBF$_4$ (PC + DME) | 3.6 | 5.1 |
| Example 2-12 | Example 1-6 | Li | 1.0 M LiBF$_4$ (PC + DME) | 3.6 | 4.8 |
| Comparative Example 2-4 | Comparative Example 2-4 | Li | 1.0 M LiBF$_4$ (PC + DME) | 3.6 | 5.3 |
| Comparative Example 2-5 | Comparative Example 2-5 | Li | 1.0 M LiBF$_4$ (PC + DME) | 3.6 | 5.2 |
| Example 3-1 | Example 1-14 | Li | 1.0 M LiBF$_4$/PC | 3.9 | |
| Example 3-2 | Example 1-9 | Li | 1.0 M LiBF$_4$/PC | 3.9 | |

| | Energy Density (mAh/g) | Short-circuit Current (mA) | Coulomb Efficiency (%) | Energy Density (per Unit Weight of Active Material) (wh/kg) | Energy Density (per Unit Weight of Electrode) (wh/kg) |
|---|---|---|---|---|---|
| Example 2-1 | 2.6 | 6.9 | | | |
| Example 2-2 | 2.5 | 6.7 | | | |
| Example 2-3 | 2.6 | 6.9 | | | |
| Comparative Example 2-1 | 0.6 | 1.1 | | | |
| Comparative Example 2-2 | 1.9 | 7.0 | | | |
| Example 2-4 | 2.3 | 6.5 | | | |
| Example 2-5 | 2.4 | 6.6 | | | |
| Example 2-6 | 2.3 | 6.3 | | | |
| Comparative Example 2-3 | 1.7 | 6.1 | | | |
| Example 2-7 | 2.2 | 6.3 | | | |
| Example 2-8 | 2.1 | 6.3 | | | |
| Example 2-9 | 2.2 | 6.4 | | | |
| Example 2-10 | 7.3 | 0.9 | | | |
| Example 2-11 | 7.5 | 0.9 | | | |
| Example 2-12 | 7.0 | 0.8 | | | |
| Comparative Example 2-4 | 5.5 | 0.7 | | | |
| Comparative Example 2-5 | 6.0 | 0.7 | | | |
| Example 3-1 | | | 100 | 374 | 47 |
| Example 3-2 | | | 100 | 363 | 46 |

EXAMPLE 3-1

The surface of a 40 μm thick aluminum sheet with a purity of 99% was sufficiently roughened by use of a CC 1000 Cw emery sheet, whereby a working electrode was prepared.

The thus prepared working electrode and a counter electrode made of a nickel sheet were immersed into an aqueous solution of 0.5M aniline and 1.5N sulfuric acid, so that the aniline was polymerized with a constant current of 1 mA/cm$^2$, and with the quantity of electricity flowed being 2.5 C/cm$^2$, whereby an aluminum - polyaniline electrode was prepared.

The thus prepared aluminum - polyaniline electrode was sufficiently washed with flow water.

This aluminum - polyaniline electrode, a counter electrode of nickel, and a saturated calomel electrode (SCE) serving as a reference electrode were immersed in an aqueous solution of 0.2N sulfuric acid and a potential of −4.0 V vs. SCE was applied so that the dedoping of the aluminum - polyaniline electrode was sufficiently performed.

The dedoped aluminum - polyaniline electrode was immersed in a solution of $LiBF_4$ dissolved in a mixed solution of PC/DME (7:3), doped by repeating a sweeping of 2.5 V vs. Li/Li$^+$ to 3.8 V vs. Li/Li$^+$ two times, washed and dried, whereby a composite polyaniline electrode 1 including an aluminum sheet 2 (refer to FIG. 19) was prepared.

The thus prepared composite polyaniline electrode 1 was coated with a polymeric solid electrolyte by dipping the electrode 1 into a dipping liquid, which was prepared by dissolving 100 g of polyethylene oxide triol, 8.5 g of $LiBF_4$, 0.006 g of dibutyltin dilaurate, and 8.5 g of tolylene-2,4-diisocyanate in 100 g of methyl ethyl ketone.

The composite polyaniline electrode 1 coated with the above polymeric solid electrolyte was heated at 70° C. for 15 minutes, so that the polyethylene oxide triol (PEO) was cross-linked and a polymeric solid electrolyte layer 15 having a thickness of about 30 μm was formed on each side of the composite polyaniline electrode 1. Then both sides of the electrode 1 coated with the polymeric electrolyte layer 15 were cladded with a 60 μm thick Li-Al alloy layer 16 with application of pressure thereto, and subsequently a nickel layer 17 having a thickness of 10 μm serving as a negative electrode collector was applied thereto by application of pressure, whereby a battery No. 15 according to the present invention, having a size of 5 cm×6 cm, as shown in FIG. 19, was prepared. In FIG. 19, reference numeral 18 indicates an external wrapping member.

The charging and discharging characteristics of the battery No. 15 were measured. The results are shown in Table 2.

EXAMPLE 3-2

A dipping liquid was prepared by dissolving 4.7 g of $LiBF_4$ in 100 g of propylene carbonate to form a solution, mixing the solution with 15 g of polyvinylidene fluoride, and heating the solution to 80° C.

The same composite polyaniline electrode 1 as that prepared in Example 3-1 was coated with the above polymeric solid electrolyte, so that a polymeric solid electrolyte layer having a thickness of about 30 μm was formed on each side of the composite polyaniline electrode. Then both sides of the electrode coated with the polymeric electrolyte layer were cladded with a 60 μm thick Li-Al alloy layer 16 with application of pressure thereto, whereby a battery No. 16 according to the present invention was prepared.

The charging and discharging characteristics of the battery No. 16 were measured. The results are shown in Table 2.

COMPARATIVE EXAMPLE 3-1

A 40 μm thick aluminum sheet with a purity of 99% was employed as a working electrode, without subjecting the same to the surface roughening treatment.

This working electrode and a counter electrode made of a nickel sheet were immersed into an aqueous solution of 0.5M aniline and 1.5N sulfuric acid, so that the aniline was polymerized with a constant current of 1 mA/cm$^2$, and with the quantity of electricity flowed being 2.5 C/cm$^2$, whereby an aluminum - polyaniline electrode was prepared in the same manner as in Example 3-1. The polyaniline film formed on the aluminum sheet was not uniform.

The thus prepared aluminum - polyaniline electrode was sufficiently washed with flowing water.

This aluminum - polyaniline electrode was doped and dedoped in the same manner as in Example 3-1, whereby a composite polyaniline electrode was prepared.

The thus prepared composite polyaniline electrode was coated with a polymeric solid electrolyte by dipping the electrode into a dipping liquid, which was prepared by dissolving 100 g of polyethylene oxide triol, 8.5 g of $LiBF_4$, 0.006 g of dibutyltin dilaurate, and 8.5 g of tolylene-2,4-diisocyanate in 100 g of methyl ethyl ketone.

The composite polyaniline electrode coated with the above polymeric solid electrolyte was heated at 70° C. for 15 minutes, so that the polyethylene oxide triol (PEO) was cross-linked and a polymeric solid electrolyte layer 15 having a thickness of about 30 μm was formed on each side of the composite polyaniline electrode. Then both sides of the electrode 1 coated with the polymeric electrolyte layer were cladded with a 60 μm thick Li-Al alloy layer with application of pressure thereto, whereby a comparative battery No. 5 was prepared.

The charging and discharging characteristics of the comparative battery No. 5 were measured. The results are shown in Table 2.

TABLE 2

| Battery Examples | Example 3-1 | Example 3-2 | Comparative Example 3-1 |
|---|---|---|---|
| Open-circuit Voltage (V) | 3.2 | 3.2 | 3.2 |
| Discharging Capacity (mAh) | 2.4 | 2.5 | 1.2 |
| Short-circuit Current (mA/cm$^2$) | 2.4 | 2.6 | 1.9 |
| Cycle Life (times) | more than 100 | more than 100 | more than 26 |
| Energy Density (mAh/g) | 4.7 | 4.9 | 2.4 |

What is claimed is:

1. A sheet-shaped electrode comprising a sheet-shaped, surface-roughened aluminum collector and an aniline based polymeric active material formed thereon.

2. The sheet-shaped electrode as claimed in claim 1, wherein said aniline based polymeric active material is coated with an electroconductive polymeric material.

3. The sheet-shaped electrode as claimed in claim 1, wherein said aniline based polymeric active material is coated with a polymeric solid electrolyte.

4. A secondary battery comprising a sheet-shaped electrode comprising as a positive electrode a sheet-shaped, surface-roughened aluminum collector and an aniline based polymeric active material formed thereon.

5. The secondary battery as claimed in claim 4, wherein said aniline based polymeric active material is coated with an electroconductive polymeric material.

6. The secondary battery as claimed in claim 4, wherein said aniline based polymeric active material is coated with a polymeric solid electrolyte.

7. A secondary battery comprising a positive electrode including an surfaced roughened aluminum collector having a terminal, a separator, and a negative electrode including a collector having a terminal, each being sheet-shaped, which positive electrode and negative electrode are folded alternately so as to cross each other through said separator, said terminals being provided at an end portion of said respective electrodes, and which positive electrode comprises an aniline based polymeric active material provided on both sides of said aluminum collector.

8. The secondary battery as claimed in claim 7, wherein said aniline based polymeric active material is coated with an electroconductive polymeric material.

9. The secondary battery as claimed in claim 7, wherein said aniline based polymeric active material is coated with a polymeric solid electrolyte.

10. A secondary battery comprising a positive electrode, a solid electrolyte and a negative electrode, said positive electrode comprising a sheet-shaped, surface-roughened aluminum collector and an aniline based polymeric active material formed thereon.

11. A secondary battery comprising a positive electrode, a solid electrolyte and a negative electrode, said positive electrode being a sheet-shaped, surface-roughened aluminum collector and an aniline based polymeric active material which is coated with an electroconductive polymeric material.

12. A secondary battery comprising a positive electrode, a solid electrolyte and a negative electrode, said positive electrode being a sheet-shaped, surface-roughened aluminum collector and an aniline based polymeric active material which is coated with a polymeric solid electrolyte.

13. A method of producing a sheet-shaped electrode comprising a sheet-shaped, surface-roughened aluminum collector and an aniline based polymeric active material formed thereon, which comprises a step of performing electrochemical polymerization of aniline or an aniline derivative in the presence of an acid with PKa in the range of $-2.5$ to $2.5$.

14. The method as claimed in claim 13, further comprising a step of continuing said electrochemical polymerization in the presence of $HBF_4$.

* * * * *

UNITED STATES PATENT AND TRADEMARK OFFICE
CERTIFICATE OF CORRECTION

PATENT NO. : 4,948,685

DATED : August 14, 1990

INVENTOR(S) : Toshiyuki Ohsawa, et al.

It is certified that error appears in the above-identified patent and that said Letters Patent is hereby corrected as shown below:

Column 5, line 59, change "compound" to --composed--.

Column 11, line 38, after "invention" insert --is used--;

line 57, after "conceivable," delete "but".

Column 12, line 20, change "that" to --than--;

line 29, change "shows" to --show--;

line 32, change "an" to --a--.

Column 13, line 2, change "come" to --comes--;

line 5, change "come" to --comes--;

line 7, change "are" to --is--;

line 10, change "5" to --6--;

line 28, change "batter" to --battery--.

Column 14, line 35, change "alinine" to --aniline--;

line 52, after "solely" insert --employed--.

Column 15, line 16, change "cladded" to --clad--.

Column 19, line 4, change "An" to --A--.

Column 21, line 27, delete "was prepared";

UNITED STATES PATENT AND TRADEMARK OFFICE
CERTIFICATE OF CORRECTION

PATENT NO. : 4,948,685

DATED : August 14, 1990

INVENTOR(S) : Toshiyuki Ohsawa, et al.

It is certified that error appears in the above-identified patent and that said Letters Patent is hereby corrected as shown below:

line 50, delete "was prepared";

line 58, change "a" to --an--.

Column 22, line 18, change "cladded" to --clad--;

line 28, change "cladded" to --clad--.

Column 28, line 11, for Comparative Example 2-1, change "$LiB_4F$" to --$LiBF_4$--;

line 32, under "Energy Density per Unit Weight of Active Material" change "wh/kg" to --mh/kg--.

Column 29, line 29, change "cladded" to --clad--;

line 53, change "cladded" to --clad--.

Column 30, line 27, change "cladded" to --clad--.

Signed and Sealed this

Fifth Day of May, 1992

*Attest:*

DOUGLAS B. COMER

*Attesting Officer*          *Acting Commissioner of Patents and Trademarks*